United States Patent
Massey et al.

(10) Patent No.: US 9,596,128 B2
(45) Date of Patent: Mar. 14, 2017

(54) APPARATUS FOR PROCESSING ONE OR MORE EVENTS

(71) Applicant: International Business Machines Corporation, Armonk, NY (US)

(72) Inventors: Samuel T. Massey, Winchester (GB); Daniel J. McGinnes, Southampton (GB); Martin A. Ross, Winchester (GB); Craig H. Stirling, Winchester (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 830 days.

(21) Appl. No.: 13/909,395

(22) Filed: Jun. 4, 2013

(65) Prior Publication Data

US 2013/0346600 A1 Dec. 26, 2013

(30) Foreign Application Priority Data

Jun. 26, 2012 (GB) .................................. 1211270.2

(51) Int. Cl.
*G06F 15/173* (2006.01)
*H04L 12/24* (2006.01)
*G06F 9/54* (2006.01)

(52) U.S. Cl.
CPC .............. *H04L 41/06* (2013.01); *G06F 9/542* (2013.01)

(58) Field of Classification Search
USPC .......................... 709/224; 719/318; 710/104
See application file for complete search history.

(56) References Cited

U.S. PATENT DOCUMENTS 6,438,618 B1* 8/2002 Lortz ...................... G06F 9/542
 719/318
8,132,184 B2* 3/2012 Gerea ..................... G06F 9/542
 710/104

(Continued)

FOREIGN PATENT DOCUMENTS

WO 0058946 10/2000

OTHER PUBLICATIONS

Sharig Rizvi, "Complex Event Processing Beyond Active Databases: Streams and Uncertainties," Electrical Engineering and Computer Sciences University of California at Berkeley, Dec. 16, 2005, 46 pages.

(Continued)

*Primary Examiner* — Tammy Nguyen
(74) *Attorney, Agent, or Firm* — Cantor Colburn LLP; Nicholas Bowman

(57) ABSTRACT

Processing events for use with a complex event processing system that includes a server computer system and a client application executable on a client computer system. The processing includes analyzing content of the events and assigning a plurality of attributes to associated event processing logic. A first attribute is associated with event processing logic that is operable to be applied at the client computer system and a second attribute is associated with event processing logic that is operable to be applied at a server computer system. The processing also includes using, in response to receiving a first event, assigned attributes to determine whether event processing logic associated with the first event is operable to be applied at the client computer system. The first event is forwarded to the server computer system based on determining that the event processing logic associated with the first event is not operable to be applied at the client computer system.

20 Claims, 3 Drawing Sheets

(56) References Cited

U.S. PATENT DOCUMENTS

| | | | |
|---|---|---|---|
| 2008/0109824 A1* | 5/2008 | Chen | G06F 9/542 |
| | | | 719/318 |
| 2009/0053218 A1* | 2/2009 | Koenig | C07K 16/283 |
| | | | 424/133.1 |
| 2009/0063218 A1* | 3/2009 | Stuhrmann | G06Q 10/063 |
| | | | 705/7.11 |
| 2010/0070981 A1* | 3/2010 | Hadar | G06F 9/542 |
| | | | 719/318 |
| 2010/0306709 A1* | 12/2010 | Lynch | G06F 17/30516 |
| | | | 715/854 |
| 2011/0078704 A1 | 3/2011 | Mishali et al. | |
| 2011/0173247 A1 | 7/2011 | Hubbard et al. | |

OTHER PUBLICATIONS

Cugola et al., "Complex Event Processing with Trex," Dip. di Elettronica e Informazione Politecnico di Milano, Italy, Nov. 15, 2010, 17 pages.

* cited by examiner

APPARATUS FOR PROCESSING ONE OR MORE EVENTS

PRIORITY

This application claims priority to Great Britain Patent Application No. 1211270.2, filed Jun. 26, 2012, and all the benefits accruing therefrom under 35 U.S.C. §119, the contents of which in its entirety are herein incorporated by reference.

BACKGROUND

The present invention relates to computer processing, and more specifically to event processing.

An event is an occurrence of some activity in a business application that is important to other applications in an enterprise. For example, the occurrence of an event may trigger an action in another business application or it may simply trigger data movement.

In large organizations, tens of millions of events occur every day but not all events or event occurrences are of equal importance. Providing insight requires the ability to determine when a pattern of related or seemingly unrelated events from one or more sources has occurred and to coordinate the execution of the responses to the pattern of events.

Complex event processing allows for detection of, and responses to, patterns in streams of simpler events. An example of a pattern is: if events A and B occur and event C does not occur in <time frame>, then do X, Y, and Z after <time frame>.

SUMMARY

Embodiments include an apparatus, a method, and a computer program product for processing one or more events for use with a complex event processing system that includes a server computer system and a client application executable on a client computer system that is operable to generate the one or more events. The method includes analysing content of the one or more events and assigning a plurality of attributes to associated event processing logic. A first attribute is associated with event processing logic that is operable to be applied at the client computer system and a second attribute is associated with event processing logic that is operable to be applied at a server computer system. The processing also includes using, in response to receiving a first event, assigned attributes to determine whether event processing logic associated with the first event is operable to be applied at the client computer system. The first event is forwarded to the server computer system based on determining that the event processing logic associated with the first event is not operable to be applied at the client computer system.

BRIEF DESCRIPTION OF SEVERAL VIEWS OF THE DRAWINGS

The present invention will now be described, by way of example only, with reference to embodiments thereof, as illustrated in the following drawings.

DETAILED DESCRIPTION

Figure 1:
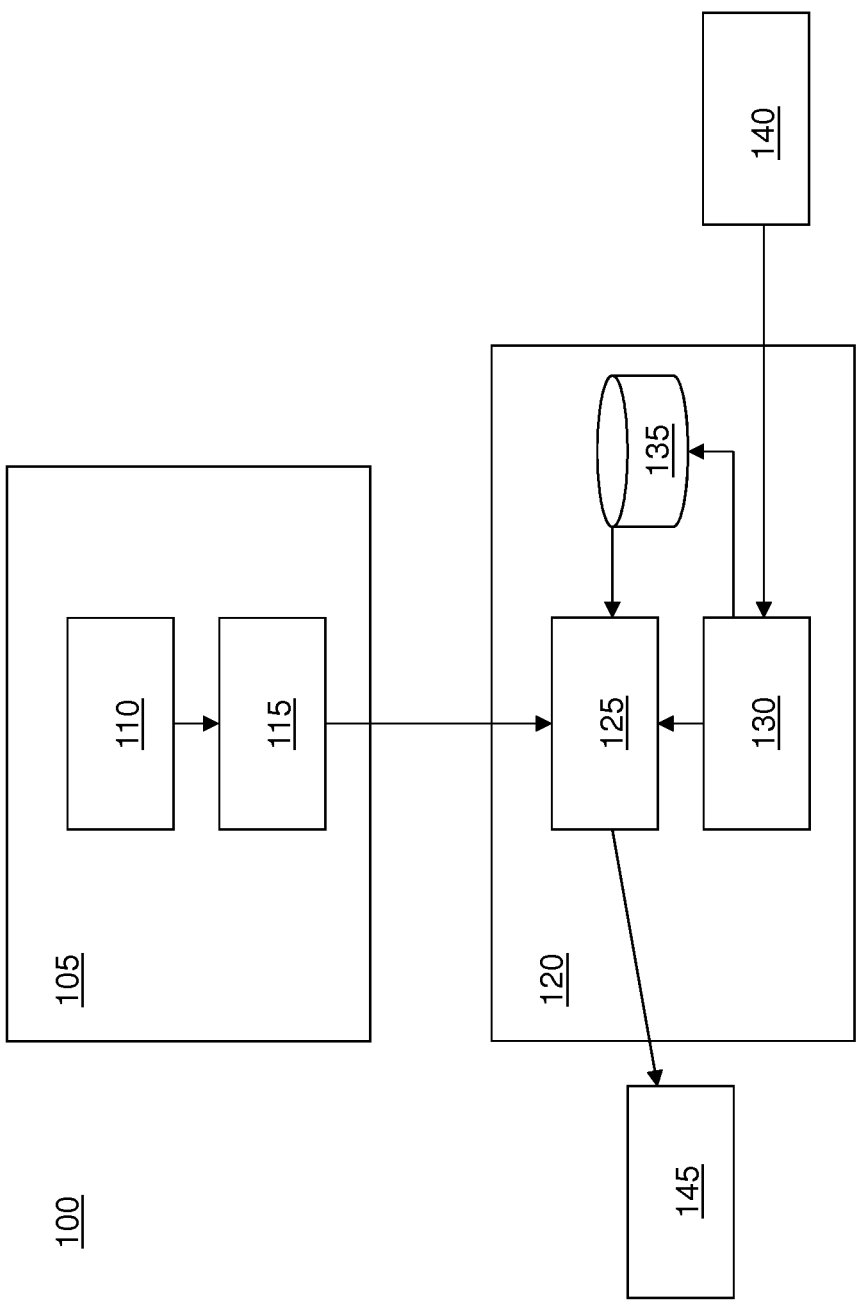
FIG. 1 is a block diagram of a complex event processing system.

As will be appreciated by one skilled in the art, aspects of the embodiments of the present invention may be embodied as a system, method or computer program product. Accordingly, aspects of embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of embodiments of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fibre, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of embodiments of the present invention may be written in any combination of one or more programming languages, including an object oriented programming language such as Java (Java and all Java-based trademarks and logos are trademarks or registered trademarks of Oracle and/or its affiliates), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

With reference to the contemporary complex event processing system 100 of FIG. 1, a client application 110 (e.g., an Internet application, a banking application) executing on a client computer system 105 generates an event. Note that the system 100 can include multiple client computer systems 105 and each client computer system 105 can include multiple client applications 110 operable to generate events.

The client application 110 invokes a messaging application programming interface (API) 115 which sends the generated event as a message to an event processor 125 executing on a server computer system 120. The event processor 125 parses the event; matches a name associated with a name of the event against a stored list of event processing logic and evaluates the received event against the associated event processing logic comprising one or more patterns that is stored in a persistent store 135. If the event evaluates true against the pattern, the event processor 125 generates an action 145. A graphical user interface (GUI) 140 is used by a user to generate and modify the event processing logic. When a change to the event processing logic is deployed to the server computer system 120, a rule management component 130 is operable to update the persistent store 135 and the event processor 125. The event processor 125 typically has a method that can be called by the rule management component 130 such that the event processor 125 can be notified to update its stored list of event processing logic that is associated with event names.

It should be noted that a contemporary complex event processing system is typically server based as the event processing logic is evaluated by an application residing on a server computer system. For certain types of event correlation this is important, for example, given an example pattern, e.g., "If a customer makes three purchases in one day, trigger an action" and given that events can be received from a number of different sources, it is necessary to perform such a correlation in a central location (e.g., by a server computer system) as individual client computer systems are not aware of the events generated by each other.

Performance can be critical in complex event processing systems where throughputs of thousands of events per second are common and server based processing can create a bottleneck.

According to exemplary embodiments, rather than event processing being performed solely at a server computer system, any simple event processing that does not require cross-event correlation across multiple, disparate events can be performed at a client computer system. Advantageously, significant performance advantages may be achieved in scenarios where a large number of events can be processed, at least in part, at the client computer system.

Figure 2:
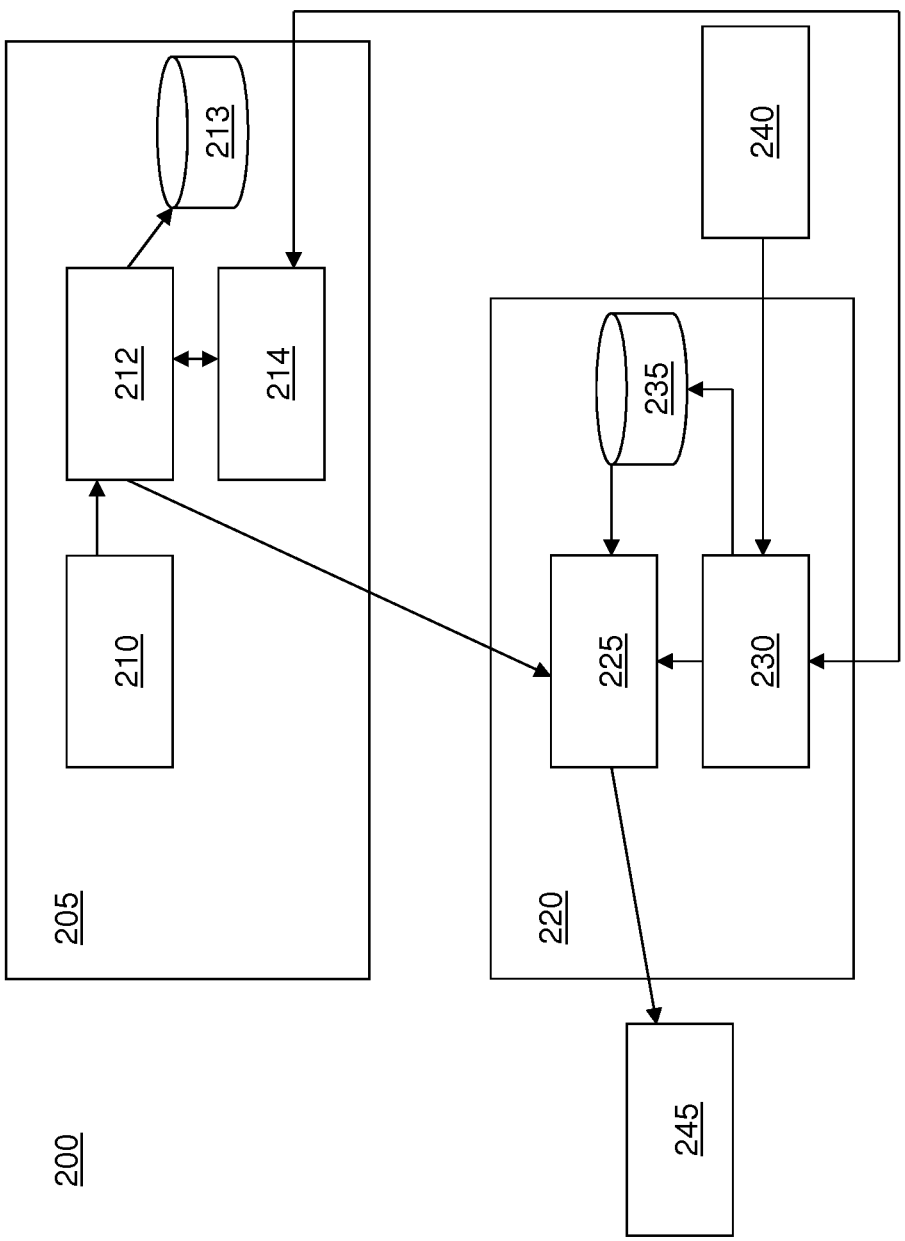
FIG. 2 is a block diagram of a complex event processing system according to an exemplary embodiment.

A complex event processing system 200 according to an exemplary embodiment is depicted in FIG. 2. The system 200 comprises a client application 210 executing on a client computer system 205, an event filter component 212 component operable to interact with client-side event processing logic (e.g., a client side library) stored in a storage component 213, and a filter manager 214.

The system 200 also comprises a server computer system 220 having an event processor 225 and a rule management component 230. A user uses a GUI 240 to manipulate the rule management component 230. Server-side event processing logic is stored in a persistent store 235. The persistent store 235 is also operable to store at least one occurrence of at least one event.

The event filter component 212 provides an API that can be called by the client application 210. The event filter component 212 can accept events from client applications that are represented as e.g., event objects (wherein an event object is a representation of an event in a given programming language) or event packets (e.g., a textual representation of an event e.g., written in XML). The event filter component 212 is operable to send events to the server computer system 220 using a messaging API, however, a calling client application 210 need not be aware of the underlying messaging infrastructure and simply makes calls to the event filter component 212. The event filter component 212 is pre-configured with a location of the event processor 225.

The event filter component 212 comprises a method that can be called by the filter manager 214 such that the event filter component 212 can be notified to update its stored list of event processing logic that is associated with event names. An example method (e.g., updateLogic (Listlogic) { }) is implementation specific, however, functionally, the method is operable to receive updated server-side event processing logic and use the updated logic when subsequently invoked.

The filter manager 214 is responsible for keeping the client-side event processing logic 213 up to date. When the client application 210 initializes, the filter manager 214 registers itself with the rule management component 230 and provides callback details associated with itself such that the filter manager 214 can receive updated server-side event processing logic from the server computer system 220.

In one embodiment, example callback details comprise a host name and a port number which the rule management component 230 uses in order to send updated server-side event processing logic in a message to the filter manager 214. The filter manager 214 listens on the port in order to receive the message.

In another embodiment, the filter manager 214 exports a static library comprising the server-side event processing logic from the server computer system 220 and any updates to the server-side event processing logic are executed manually, that is, by redeploying the static library at each client computer system.

Figure 3:
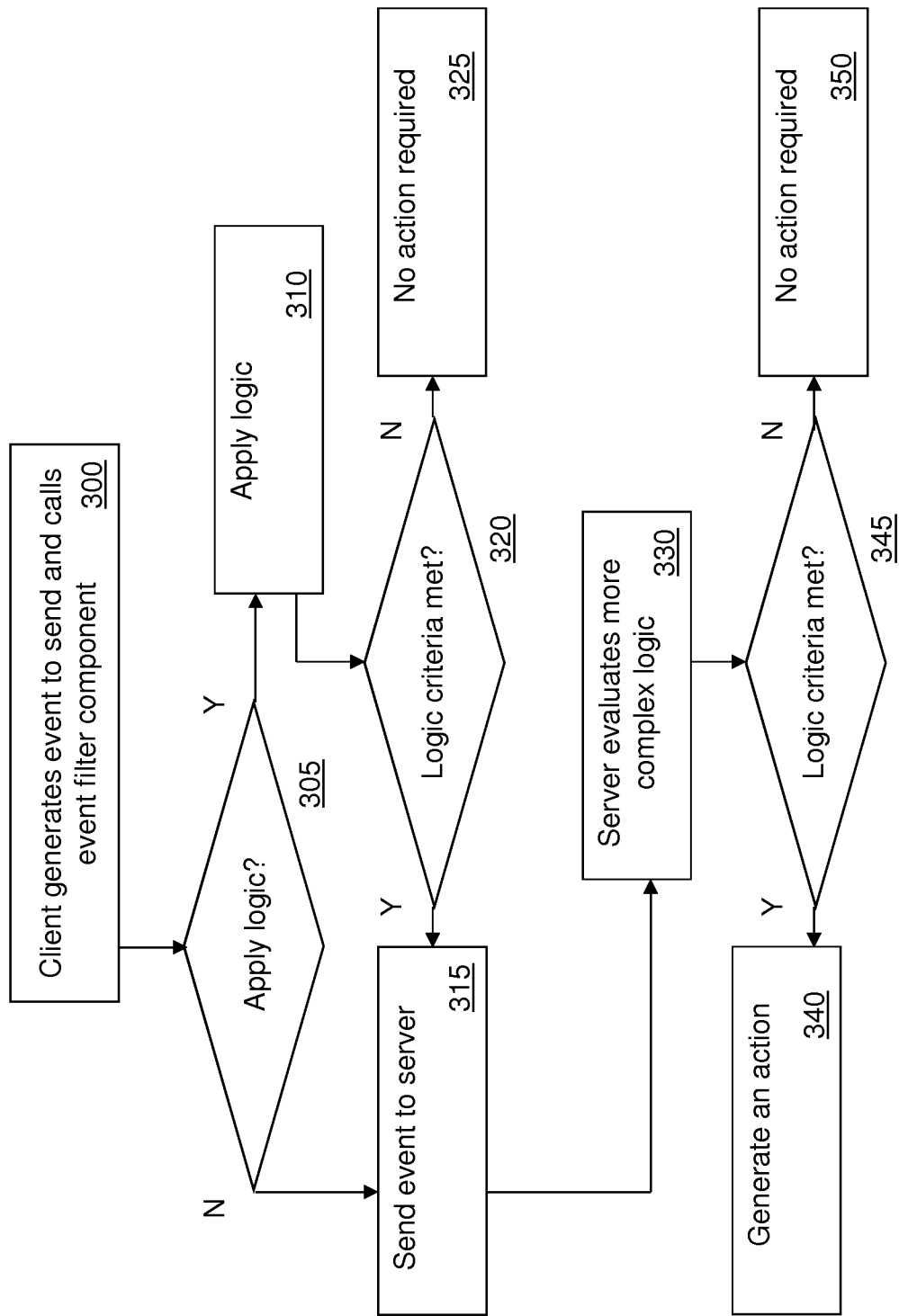
FIG. 3 is a flow chart of event processing according to an exemplary embodiment.

A process according to an exemplary embodiment will now be described with reference to FIG. 3.

At block 300, the client application 210 generates an event and calls the event filter component 212 component in order to send the generated event. An example call comprises sendEvent(String message) where "String message" denotes the content of the event.

The event filter component 212, in response to receiving the event, parses the event to obtain an "Event Name" and compares the Event Name against a list of event processing logic. If the Event Name is not known to the event filter component 212, this means that there is no associated event processing logic associated with the event and thus, no action need be generated for the event. In this case, the event filter component 212 discards the event.

If the Event Name is known to the event filter component 212, at block 305, the event filter component 212 determines if there is any client-side event processing logic 213 to be applied. If the event filter component 212 determines that there is no client-side event processing logic 213 to be applied (e.g., because the event does not match any patterns associated with the client-side event processing logic 213), the event filter component 212 forwards, at block 315, the event to event processor 225.

If the Event Name is known to the event filter component 212 and if at block 305, the event filter component 212 determines that there is client-side event processing logic 213 to be applied, the event filter component 212 applies, at block 310, client-side event processing logic 213 to one or more fields associated with the event. During the application, the event filter component 212 applies relatively simple sub-patterns to the event. This will be described in more detail with reference to the examples.

At block 320, if the event filter component 212 determines that criteria defined by the one or more patterns are not met, the event filter component 212 discards the event and no further action is taken at block 325.

At block 320, if during evaluation of the client-side event processing logic 213 against the event, the event filter component 212 determines that criteria defined by one or more patterns associated with the client-side event processing logic 213 are met, the event filter component 212 forwards, at block 315, the event to the event processor 225.

At block 330, the event processor 225 evaluates the event against the server-side event processing logic by applying the remaining relatively complex sub-patterns to the event (this will be described in more detail with reference to the examples.

At block 345, if during evaluation of the sever-side event processing logic 213 against the event, the event processor 225 determines that criteria defined by one or more patterns associated with the server-side event processing logic 213 are met, the event processor 225 generates, at block 340, an action.

At block 345, if the event processor 225 determines that criteria defined by the one or more patterns are not met, the event processor 225 discards the event and no further action is taken at block 350.

A first example will now be described with reference to FIG. 3.

At block 300, the client application 210 generates an event in response to a customer making a purchase of £10.

An example of the event is shown below:

| Event_1 |
|---|
| <PurchaseEvent><br><CustomerID type="String">A12345</CustomerID><br><customerName type="String">Dan</strikePrice><br><merchantID type="String">M1234</stock><br><amount type="Real">10.0</lastPrice><br></PurchaseEvent> |

The client application 105 passes the event to the event filter component 212 which parses the event to obtain an Event Name (e.g., PurchaseEvent).

In the first example, the Event Name is known to the event filter component 212 and at block 305, the event filter component 212 compares the Event Name against a list of associated event processing logic. An example of a list comprising an Event Name and associated logic is shown in the table below:

| EventName | Attribute | Logic |
|---|---|---|
| purchaseEvent | Simple | If field(amount) >100 then largePurchaseEvent |
| largePurchaseEvent | Complex | If (occurrences of this Event in 1 day) then WarningAction |
| changeAddressEvent | Complex | If (occurrences of this Event in 1 month) >2 then InvestigateAddressAction |

With reference to the list above, when logic associated with an Event Name is deployed, the rule management component 230 analyses content of the logic and assigns an attribute. The rule management component 230 assigns a "Simple" attribute to logic that should be processed by the event filter 212 and assigns a "Complex" attribute to logic that should be processed by the event processor 225.

In an example, the rule management component 230 is operable to assign a "Simple" attribute when a parameter (e.g., field(amount)) associated with logic (e.g., If field (amount)>100 then largePurchaseEvent) is contained within an event (e.g., Event_1) itself as such processing can be carried out by the event filter 212 due to the event filter 212 having knowledge of the content of the event.

In an example, the rule management component 230 is operable to assign a "Complex" attribute when a number of occurrences of events (e.g., (occurrences of this Event in 1 day)) associated with logic (e.g., If (occurrences of this Event in 1 day) then WarningAction) generated by one or more client applications needs to be counted. Such processing typically needs to be carried out by the event processor 225 at the server computer system 220 because a client computer system 205 would typically not have awareness of events generated by other client computer systems.

An example of a pattern associated with purchaseEvent and largePurchaseEvent is shown below:

Pattern 1:
Aim: "If a customer makes 3 purchases over £100 in a day trigger a Warning Action"
Rules:
Rule 1: If the 'amount' field in a purchase event is >£100 then fire a "large purchase event"
Rule 2: If there are 3 occurrences of "large purchase event" in a day then trigger a Warning Action In response to the comparison of the Event Name, namely, PurchaseEvent, against the associated event processing logic, the event filter component 212 determines that there is client-side event processing logic 213 to be applied as PurchaseEvent has a "Simple" attribute.

The event filter component 212 applies, at block 310, client-side event processing logic 213 to one or more fields associated with the event. In more detail, the event filter component 212 compares a value in the "amount type="Real">" field of Event_1 against Rule 1, specifically against the value 100.

In the first example, at block 320, the event filter component 212 determines that criteria (namely, Rule 1) defined by the one or more patterns are not met and event filter component 212 discards the event and no further action (block 325) is required.

A second example will now be described with reference to FIG. 3.

At block 300, the client application 210 generates an event in response to a customer making a purchase of £110.

An example of the event is shown below:

| Event_2 |
|---|
| <PurchaseEvent> |
| <CustomerID type="String">A12345</CustomerID> |
| <customerName type="String">Dan</strikePrice> |
| <merchantID type="String">M1234</stock> |
| <amount type="Real">110.0</lastPrice> |
| </PurchaseEvent> |

The client application 210 passes the event to the event filter component 212 which parses the event to obtain an Event Name (e.g., PurchaseEvent).

In the example, the Event Name is known to event filter component 212 and, at block 305, the event filter component 212 compares the Event Name against the above list of associated event processing logic. An example of a pattern associated with the client-side event processing logic 213 is shown above, namely, Pattern 1.

In response to the comparison of the Event Name, namely, PurchaseEvent, against the associated event processing logic, the event filter component 212 determines that there is client-side event processing logic 213 to be applied as PurchaseEvent has a "Simple" attribute.

The event filter component 212 applies, at block 310, client-side event processing logic 213 to one or more fields associated with the event. In more detail, the event filter component 212 compares a value in the "amount type="Real">" field of Event_2 against Rule 1, specifically against the value 100.

In the example, at block 320, the event filter component 212 determines that criteria (namely, Rule 1) defined by the one or more patterns is met and the event filter component 212, according to Rule 1, generates and forwards, at block 315, a "large purchase event" to the event processor 225.

An example of the event is shown below:

| Event_3 |
|---|
| <LargePurchaseEvent> |
| <CustomerID type="String">A12345</CustomerID> |
| <customerName type="String">Dan</strikePrice> |
| <merchantID type="String">M1234</stock> |
| <amount type="Real">110.0</lastPrice> |
| </LargePurchaseEvent> |

At block 330, the event processor 225 compares the Event Name against the above list of associated event processing logic.

In response to the comparison of the Event Name, namely, LargePurchaseEvent, against the associated event processing logic, the event processor 225 determines that there is server-side event processing logic to be applied as LargePurchaseEvent has a "Complex" attribute.

In more detail, during the evaluation, the event processor 225 accesses the persistent store 235 in order to determine how many occurrences of the event have occurred before. As this is the first occurrence of the event, at block 345, if the event processor 225 determines that criteria (namely, Rule 2) defined by the one or more patterns are not met and the event processor 225 discards the event and no further action (block 350) is required. The event processor 225 stores the first occurrence of the event in the persistent store 235.

If the LargePurchaseEvent event occurs a further two times, in accordance with Rule 2, at block 345, the event processor 225 determines that criteria (namely, Rule 2) defined by one or more patterns associated with the server-side event processing logic 213 are met and the event processor 225 generates, at block 340, a Warning action which can be accessed programmatically or by the user using the GUI 240.

An example of the action is shown below:

| Action_1 |
|---|
| <WarningAction> |
| <CustomerID type="String">A12345</CustomerID> |
| <customerName type="String">Dan</strikePrice> |
| <numberOfLargePurchases type="Integer">3</stock> |
| <Datetype="String">12thJune2012</lastPrice> |
| </WarningAction> |

In accordance with an embodiment of the present invention, a user can modify the server-side event processing logic. In an example, the user uses the GUI to modify the server-side event processing logic so that only events over £200 evaluate true against a pattern. The user uses the GUI 240 to manipulate the rule management component 230 in order to modify the server-side event processing logic.

An example of the modified server-side event processing is shown below:

Pattern 2:
Aim: "If a customer makes 3 purchases over £200 in a day trigger a Warning Action"
Rules:
Rule 1: If the 'amount' field in a purchase event is >£200 then fire a "large purchase event".
Rule 2: If there are 3 occurrences of "large purchase event" in a day then trigger a Warning Action The rule management component 230 updates the filter manager 214 with the new server-side event processing logic by making a call to the filter manager 214 using the callback that the filter manager 214 has previously registered. The filter manager 214 calls a method associated with the event filter component 212 to inform it to update its stored list of event processing logic that is associated with an event name. Subsequently, purchase events >£200 evaluate true against the Pattern_2.

An updated list of event processing logic is shown in the table below:

| EventName | Attribute | Logic |
| --- | --- | --- |
| purchaseEvent | Simple | If field(amount) >200 then largePurchaseEvent |
| largePurchaseEvent | Complex | If (occurrences of this Event in 1 day) then WarningAction |
| changeAddressEvent | Complex | If (occurrences of this Event in 1 month) >2 then InvestigateAddressAction |

Embodiments of the present invention allow simple filtering of events using a client-side library and API. An event need only be sent to a server computing system if client-side event processing logic cannot be applied by the client computer system. Further, the event need only be sent to a server computing system if logic criteria are met. Alternatively, if logic criteria are met and if there is no further logic to be applied by the server computing system, the client computer system takes no further action.

Embodiments of the present invention also provide the ability to update the client-side event processing logic associated with the client-side library to keep the client-side event processing logic in step with the server-side event processing logic.

Advantageously, if there are a significant number of events whereby simple logic can be applied to an event at a client computer system, this has significant performance advantages as the application is very cheap compared with the cost of sending the event using a messaging API such that a server computer system can process the event. Embodiments of the present invention have the technical benefits of requiring less CPU cycles and reducing load on the messaging system, the latter of which can be a bottleneck in complex event processing systems. In turn, advantageously, cost overhead for customers with respect to hardware required to run a complex event processing system and an associated messaging backbone are reduced.

The invention claimed is:

1. An apparatus for processing one or more events for use with a complex event processing system comprising a server computer system and a client application executable on a client computer system which is operable to generate the one or more events, the apparatus comprising:

a rule management component configured to analyse content of the one or more events and to assign a plurality of attributes to associated event processing logic, wherein a first attribute is associated with event processing logic that is operable to be applied at the client computer system and a second attribute is associated with event processing logic that is operable to be applied at a server computer system; and an event filter component executable on the client computer system and configured to:
receive a first event at the client computer system, the first event including a first event name;
determine, at the client computer system independently of the server computer system, based on the assigned attributes and the first event name, whether event processing logic associated with the first event is operable to be applied at the client computer system;
based on determining that event processing logic associated with the first event is operable to be applied at the client computer system:
determining whether the first event meets criteria described by the event processing logic; and
based on determining that the first event meets criteria described by the event processing logic, executing the event processing logic that is operable to be applied at the client computer system to update the first event and forwarding the updated first event to the server computer system; and
based on determining that event processing logic associated with the first event is not operable to be applied at the client computer system:
determine, at the client computer system, based on the assigned attributes and the first event name, whether event processing logic associated with the first event is operable to be applied at the server computer system; and
forward the first event to the server computer system based on the event processing logic associated with the first event being determined to be operable to be applied at the server computer system.

2. An apparatus as claimed in claim 1, wherein the event filter component is further configured to forward the first event to the server computer system further based on criteria associated with the event processing logic being met.

3. An apparatus as claimed in claim 1, wherein the event filter component is further configured to compare an event identifier with the assigned attributes to determine whether associated event processing logic associated with the first event is operable to be applied at the client computer system.

4. An apparatus as claimed in claim 1, wherein the event filter component comprises an associated application programming interface (API) that is configured to be called by the client application.

5. An apparatus as claimed in claim 1, further comprising a filter manager configured to update the event processing logic at the client computer system.

6. An apparatus as claimed in claim 5, wherein the filter manager is further configured to register data with the rule management component in order to receive the updated event processing logic from the rule management component.

7. An apparatus as claimed in claim 5, wherein the filter manager is further configured to export the updated event processing logic from the server computer system and deploy the updated event processing logic at the client computer system.

8. An apparatus as claimed in claim 1, further comprising: a graphical user interface (GUI) configured to manipulate the rule management component in order to update the event processing logic.

9. A method for processing one or more events for use with a complex event processing system comprising a server computer system and a client application executable on a client computer system which is operable to generate the one or more events, the method comprising:
analysing content of the one or more events and assigning a plurality of attributes to associated event processing logic, wherein a first attribute is associated with event processing logic that is operable to be applied at the client computer system and a second attribute is associated with event processing logic that is operable to be applied at a server computer system;
receiving a first event at the client computer system, the first event including a first event name;
determining, at the client computer system independently of the server computer system, based on the assigned attributes and the first event name, whether event processing logic associated with the first event is operable to be applied at the client computer system;
based on determining that event processing logic associated with the first event is operable to be applied at the client computer system:
determining whether the first event meets criteria described by the event processing logic; and
based on determining that the first event meets criteria described by the event processing logic, executing the event processing logic that is operable to be applied at the client computer system to update the first event and forwarding the updated first event to the server computer system; and
based on determining that event processing logic associated with the first event is not operable to be applied at the client computer system:
determining, at the client computer system, based on the assigned attributes and the first event name, whether event processing logic associated with the first event is operable to be applied at the server computer system; and
forwarding the first event to the server computer system based on determining that the event processing logic associated with the first event is operable to be applied at the server computer system.

10. A method as claimed in claim 9, further comprising forwarding the first event to the server computer system further based on criteria associated with the event processing logic being met.

11. A method as claimed in claim 9, further comprising: comparing an event identifier with the assigned attributes to determine whether associated event processing logic associated with the first event is operable to be applied at the client computer system.

12. A method as claimed in claim 9, further comprising: using, in response to receiving the first event, assigned attributes to determine whether associated event processing logic associated with the first event is operable to be applied at the server computer system.

13. A method as claimed in claim 9, further comprising: calling, by the client application, an API associated with the client computer system in response to generating an event.

14. A method as claimed in claim 9, further comprising: updating the event processing logic at the client computer system.

15. A method as claimed in claim 14, further comprising: registering data associated with the client computer system in order to receive the updated event processing logic from the server computer system.

16. A method as claimed in claim 14, further comprising: exporting the updated event processing logic from the server computer system; and deploying the updated event processing logic at the client computer system.

17. A method as claimed in claim 9, further comprising updating the event processing logic.

18. A computer program product for processing one or more events for use with a complex event processing system comprising a server computer system and a client application executable on a client computer system which is operable to generate the one or more events, the computer program product comprising:
a non-transitory computer readable storage medium having program code embodied therewith, the program code executable by a processor for:
analysing content of the one or more events and assigning a plurality of attributes to associated event processing logic, wherein a first attribute is associated with event processing logic that is operable to be applied at the client computer system and a second attribute is associated with event processing logic that is operable to be applied at a server computer system;
receiving a first event at the client computer system, the first event including a first event name;
determining, at the client computer system independently of the server computer system, based on the assigned attributes and the first event name, whether event processing logic associated with the first event is operable to be applied at the client computer system;
based on determining that event processing logic associated with the first event is operable to be applied at the client computer system:
determining whether the first event meets criteria described by the event processing logic; and
based on determining that the first event meets criteria described by the event processing logic, executing the event processing logic that is operable to be applied at the client computer system to update the first event and forwarding the updated first event to the server computer system; and
based on determining that event processing logic associated with the first event is not operable to be applied at the client computer system:
determining, at the client computer system, based on the assigned attributes and the first event name, whether event processing logic associated with the first event is operable to be applied at the server computer system; and
forwarding the first event to the server computer system based on determining that the event processing logic associated with the first event is operable to be applied at the server computer system.

19. The method as claimed in claim 9, further comprising: determining by the client computer system whether the first event is simple or complex based on a set of rules, wherein the first event is operable to be applied at the client computer system based on determining that the first event is simple, and the first event is determined to be operable to be applied at the server computer system and not at the client computer system based on determining that the first event is complex.

20. The method as claimed in claim 19, wherein the first event is determined to be complex based on the first event requiring input from at least one other client computer system.

* * * * *